J. CAIN.

Assignor, by mesne assignments, to STEARNS MANUFACTURING CO.

Head Block for Saw Mills.

No. 8,162. Reissued April 9, 1878.

WITNESSES,

Jas. D. Miller.

Jno. D. McFarland.

INVENTOR,

John Cain by Jno. C. Hallock atty.

N. PETERS, PHOTO-LITHOGRAPHER, WASHINGTON, D. C.

J. CAIN.

Assignor, by mesne assignments, to STEARNS MANUFACTURING CO.

Head Block for Saw Mills.

No. 8,162. Reissued April 9, 1878.

WITNESSES

Jas. D. Miller

Jno. D. McFarland

INVENTOR

John Cain by Jno. K. Hallock atty

N. PETERS, PHOTO-LITHOGRAPHER, WASHINGTON, D. C.

UNITED STATES PATENT OFFICE.

JOHN CAIN, OF SANDY LAKE, ASSIGNOR, BY MESNE ASSIGNMENTS, TO STEARNS MANUFACTURING COMPANY, OF ERIE, PENNSYLVANIA.

IMPROVEMENT IN HEAD-BLOCKS FOR SAW-MILLS.

Specification forming part of Letters Patent No. 131,051, dated September 3, 1872; Reissue No. 8,162, dated April 9, 1878; application filed February 20, 1878.

*To all whom it may concern:*

Figure 1:
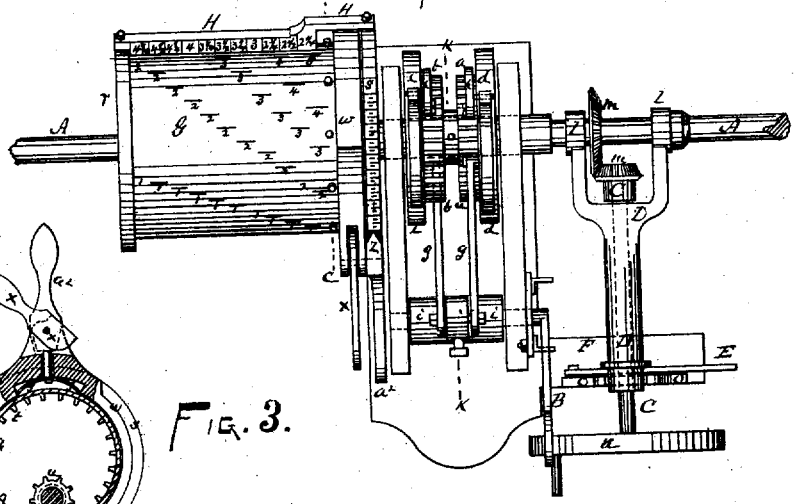
Figure 3:
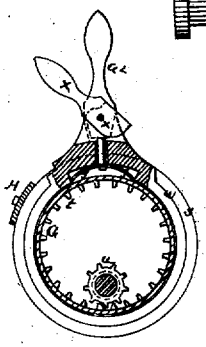
Figure 2:
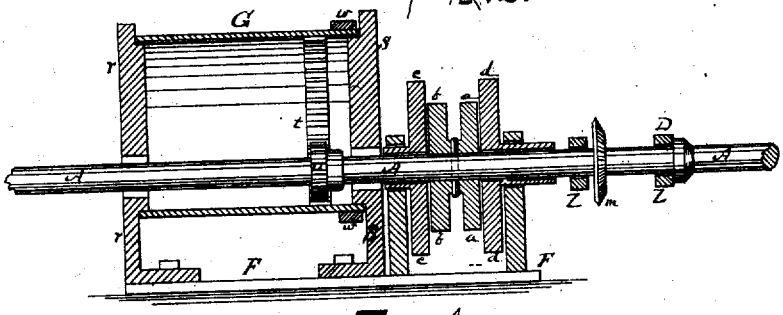
Figure 4:
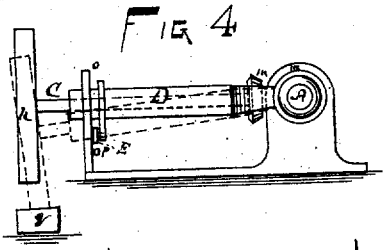
Figure 5:
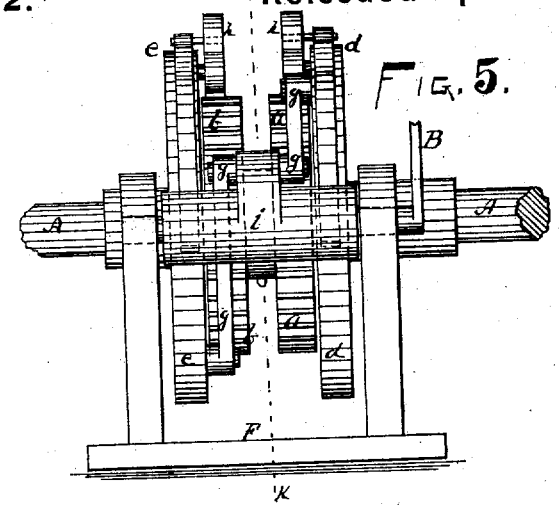
Figure 6:
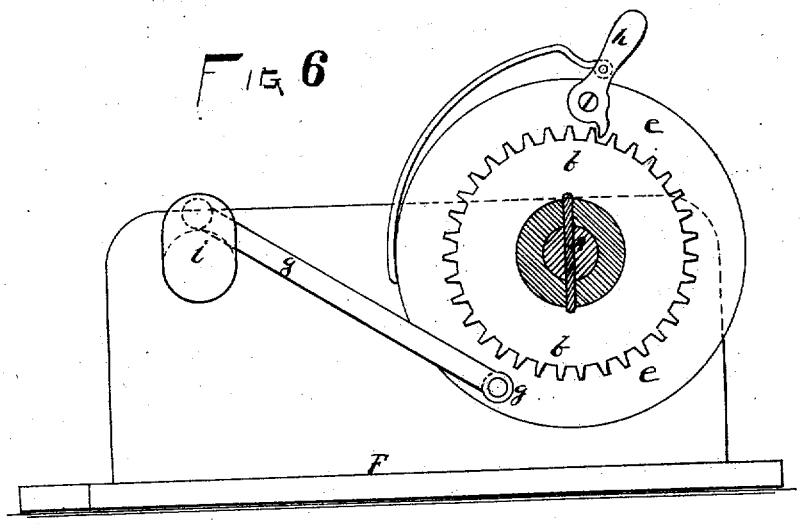

Be it known that I, JOHN CAIN, of Sandy Lake, in the county of Mercer and State of Pennsylvania, have invented a new Improvement in Head-Blocks for Saw-Mills, of which the following is a specification:

In the accompanying drawing, Figure 1 is a top view of my improved apparatus. Fig. 2 is a longitudinal vertical section of the same. Fig. 3 is a transverse vertical section on the line *c c*, Fig. 1. Fig. 4 is a side elevation of the parts marked D, C, &c., on the right of Fig. 1. Fig. 5 is a direct front elevation of the central part of Fig. 1, and Fig. 6 is a transverse vertical section on the line *k k*. (Seen in Figs. 1 and 5.) Figs. 5 and 6 are drawn on a larger scale than the other figures. Figs. 1 to 4, inclusive, are on Sheet No. 1, and Figs. 5 and 6 are on Sheet No. 2.

Similar letters of reference indicate corresponding parts.

My invention relates to the mechanism by which the log is fed to the saw by the transverse action of the knees; but it does not relate to the construction or operation of the knees; hence they are not shown in the drawings, the parts shown being the main setting or knee-actuating shaft A and the means I have devised for operating said shaft, both to feed and to recede said shaft, or rather to feed and recede the knees connected with said shaft.

My invention consists, first, in the means devised for rotating the shaft A for feeding the log to the saw; second, in the means devised for revolving said shaft for receding the knees for the reception of a new log; and therefore, first, of the means I have devised for rotating the shaft A for advancing the knees.

In the drawing, this mechanism is shown in the central part of Figs. 1 and 2, and it is more fully shown in Figs. 5 and 6. Attached to the shaft A is a ratchet-wheel, *a b*. This is, in appearance, two ratchet-wheels, but in effect it is the same as one, and, as the two I show join in the hub at the shaft, it is in reality one wheel; and whether one or two wheels are, in fact, used makes no difference, for the shaft A is a continuous solid shaft, and if two separate wheels were keyed to it they would be in effect one, for they would move together as one wheel. On each side of this ratchet *a b* are disks *e d*, which are loosely collared onto the shaft A, and are concentric with said shaft and with the ratchet *a b*. These disks, being loosely collared to the shaft, are free to move in either direction. Attached to each of these disks, on the side toward the ratchet, which is between them, are pawls *h h*, which engage with the ratchet *a b*. So it will be seen that the disks are simply carriers for the pawls. These disks or carriers are operated by being connected, by connecting-rods *g g*, with a rock-shaft, *i*, which extends from or forms a part of an actuating-lever, B. This lever is shown at one end of the shaft *i*; but it may extend from the shaft at any point desirable. The connecting-rods *g g* extend from one side of the rock-shaft *i*, and connect with the disks or carriers at opposite sides of the shaft A. The result of this arrangement is that, as the rock-shaft or lever B is tipped toward the shaft A, the disk *d* will revolve in the same direction, while the disk *c* will revolve in the opposite direction. The result of this action is that the pawl *b* on the disk *d*, acting on the ratchet, revolves the shaft A, and the pawl *h* on the other disk has moved back for a fresh hold. When the lever B is brought toward the operator the pawl *h* on disk *c* moves the ratchet, while the other pawl comes back for a fresh hold. Thus each movement of the lever B actuates the shaft A—that is to say, the lever is double-acting. A single action can be had by dispensing with one of the pawls, carriers, and connections with the shaft *i*.

I am aware that pawls connected with carriers which are concentric with the ratchet and shaft are not new, (see patent to Selden,) and I am aware that double action in connection with such carriers is old; (see patent to W. S. Jenks, 1871;) but in all such cases the carrier is extended and used as the actuating-lever; but my invention consists in the use of carriers which are separate, or not part of the lever, but which act in conjunction with said lever by means of proper connections therewith.

The second part of my invention consists in the means devised for receding the knees for the reception of a new log. When this occurs the pawls *h h* must be thrown out of gear, so that the shaft A may be revolved in the opposite direction. A shaft, C, hanging in a frame, D, that is at *l l* hung to the shaft A, is, by bevel-wheels *m m*, connected with said shaft A, as shown in Fig. 1. The shaft C carries a friction-wheel, *n*, at its outer end.

When the shaft A is used to feed a log in manner above specified, the frame D, carrying the shaft C, is held horizontal by a lever, E, which is pivoted to a vertical post, *o*, of the saw-carriage frame F, and rests on a stop, *p*, as shown in Fig. 4; but when the pawls *h h* are thrown out of gear the lever E is swung clear of the stop *p*, and allows the frame D of the shaft C to drop into the inclined position shown by dotted lines in Fig. 4, when the friction-wheel *n* strikes or rests upon a stationary rail, *q*. When the carriage is moved, the wheel *n*, rolling on the rail *q*, will revolve the shaft C, and, by the wheels *m m*, will revolve the shaft A, which in its turn will affect the knees, as desired.

What I claim as new is—

1. The combination, within the setting mechanism of a saw-mill head-block, of a ratchet device which is operated upon by a pawl which is attached to a carrier which is concentric with said ratchet, and is operated by being connected with a counter-shaft, which is operated by the attendant, substantially as and for the purposes mentioned.

2. The combination, within the setting mechanism of a saw-mill head-block, of a ratchet device which is operated upon by two pawls, which are attached, respectively, to carriers which are concentric with said ratchet, and are operated by being connected with a counter-shaft in such a manner that the said pawls shall oscillate toward and from each other alternately, substantially as and for the purposes mentioned.

3. The combination, within the setting mechanism of a saw-mill head-block, of a ratchet-wheel upon a shaft, a pawl-carrier, an actuating-lever, and mechanism for operating said carrier from said lever, substantially as and for the purposes described.

4. The log-setting apparatus composed of the shaft A, ratchet-wheel *a b*, loose disks *d e*, rods *g g*, pawls *h h*, shaft *i*, and lever B, all arranged to operate substantially as herein shown and described.

5. The shaft C, hanging in the vibrating frame D, and carrying a friction-wheel, *n*, when arranged to gear into the shaft A, substantially as herein shown and described.

In testimony whereof I, the said JOHN CAIN, have hereunto fixed my hand.

JOHN CAIN.

Witnesses:
EVA L. CUMMINGS.
G. B. CUMMINGS.